United States Patent [19]

Mathur et al.

[11] Patent Number: 4,947,465

[45] Date of Patent: Aug. 7, 1990

[54] METHOD OF LASER DISCRIMINATION USING STIMULATED LUMINESCENCE

[76] Inventors: Veerendra K. Mathur, 3680 Sellman Rd., Beltsville, Md. 20705; Kishalaya Chakrabarti, 1001 Rockville Pike, Apt. 1314, Rockville, Md. 20852

[21] Appl. No.: 385,032

[22] Filed: Jul. 25, 1989

[51] Int. Cl.$^5$ ............................................. C09K 11/08
[52] U.S. Cl. ................................. 250/484.1; 250/337; 252/301.45
[58] Field of Search .................... 250/327.1, 484.1 A, 250/484.1 B, 337; 252/301.4 S, 301.6 S

[56] References Cited

U.S. PATENT DOCUMENTS

| | | | |
|---|---|---|---|
| H311 | 7/1987 | Jones et al. | 372/19 |
| 2,979,467 | 4/1961 | Keller | 252/301.4 S |
| 3,014,147 | 12/1961 | Morton | 313/65 |
| 3,188,467 | 6/1965 | Weissenberg | 250/71 |
| 3,229,097 | 1/1966 | Durkee et al. | 250/108 |
| 3,320,180 | 5/1967 | Swinehart | 250/484.1 A |
| 3,333,101 | 7/1967 | Bell | 250/83.3 |
| 3,375,372 | 3/1968 | Miyashita | 250/83.3 |
| 3,637,518 | 1/1972 | Nada et al. | 252/301 |
| 3,659,136 | 4/1972 | Grodkiewicz et al. | 313/108 |
| 3,996,472 | 12/1976 | Rabatin | 250/337 |
| 4,230,598 | 10/1980 | Vedrine et al. | 252/301.4 |
| 4,261,854 | 4/1981 | Kotera et al. | 250/327.2 A |
| 4,314,743 | 2/1982 | Rast | 350/354 |
| 4,507,562 | 3/1985 | Gasiot et al. | 250/484.1 B |
| 4,517,463 | 5/1985 | Gasiot et al. | 250/327.2 E |
| 4,705,952 | 11/1987 | Lindmayer | 250/484.1 |
| 4,806,757 | 2/1989 | Kano et al. | 250/327.2 |
| 4,806,772 | 2/1989 | Lindmayer | 250/484.1 |
| 4,830,875 | 5/1989 | Lindmayer | 250/327.2 A |

Primary Examiner—Janice A. Howell
Assistant Examiner—Drew A. Dunn
Attorney, Agent, or Firm—John D. Lewis; Kenneth E. Walden

[57] ABSTRACT

A method of determining the nature of an unspecified laser source using the optically and thermally stimulated luminescence characteristics of a single MgS phosphor doped with either Ce, Sm or Eu, Sm ions. The doped MgS phosphor is first exposed to charging radiation thereby allowing electron trapping to occur. Subsequent to the electron trapping, the phosphor is exposed to the energy of an unspecified laser source which frees the trapped electrons. The freed electrons are then available for recombination which results in a specific color luminescence indicative of the type of laser source.

9 Claims, 2 Drawing Sheets

METHOD OF LASER DISCRIMINATION USING STIMULATED LUMINESCENCE

ORIGIN OF THE INVENTION

The invention described herein was made in the performance of official duties by employees of the Department of the Navy and may be manufactured, used, licensed by or for the Government for any governmental purpose without payment of any royalties thereon.

BACKGROUND OF THE INVENTION

1. Field of the Invention

This invention relates to photoluminescence and in particular to a method of laser discrimination using stimulated luminescence.

2. Description of the Prior Art

The use of rare earth doped alkaline earth sulfide as an efficient phosphor has been known for some time. However, since the advent of different types of laser sources, there has been renewed interest in using these phosphors as optically stimulated luminescence (OSL) dosimeters and infrared sensors. For these devices, storage phosphors are necessary and doubly doped alkaline earth sulfides are known to be efficient storage phosphors.

A second type of luminescence called thermoluminescence (TL) occurs when a charged phosphor is heated. A charged phosphor is one that has trapped electrons. The heating of the charged phosphor can be achieved by conventional methods such as direct contact of the phosphor with a heated object or by using an infrared beam produced by incandescence. Recently, heating has also been achieved by irradiation with a suitable laser beam which is absorbed directly by the charged phosphor or via a supporting substrate. Heating of a charged phosphor causes detrapping of the trapped charges. The radiative recombinations of the released charges with the opposite charges at the recombination centers causes the thermoluminescence to occur.

A fine discussion of doubly doped alkaline earth sulfides used as storage phosphors can be found in U.S. Pat. No. 4,806,772 issued to Lindmayer. Lindmayer applies the fundamentals of electron trapping in disclosing a process for making an infrared sensing device capable of detecting a known infrared light source. A point of luminescence on the device indicates where the infrared beam is striking the device. Therefore, the device is useful as a detecting tool for scientific or industrial instrumentation.

The limitation of Lindmayer and other prior art stimulated luminescence techniques is that known sources of infrared stimulation are merely detected by the phosphors through luminescence. These prior art stimulation techniques involve the matching of a known laser source to a phosphor known to emit luminescence when stimulated by the known laser source. Unfortunately, lasers being used for the tracking and ranging of moving objects vary in wavelength and intensity. Accordingly, prior art stimulation techniques do not address the problem of laser discrimination using a single phosphor.

SUMMARY OF THE INVENTION

It is therefore an object of the present invention to provide a method of laser discrimination in an unspecified laser field using stimulated luminescence.

It is a further object of the present invention to provide a method of laser discrimination in an unspecified laser field that utilizes a single phosphor.

Other objects and advantages of this invention will become more apparent hereinafter in the specification and drawings.

In accordance with the invention, a rare earth doped alkaline sulfide such as MgS is doubly doped with Ce, Sm.

The resulting doubly doped phosphor MgS: $Ce^{3+}$, $Sm^{3+}$ is exposed to charging radiation for a five to ten minute interval. Subsequent to exposure to the charging radiation, the phosphor is exposed to unspecified laser source. The unspecified laser source causes the phosphor to be stimulated optically or thermally. Optical stimulation is caused by near infrared lasers (0.8–1.5 micrometers) and results in $Ce^{3+}$ emission peaking in the green region. Thermal stimulation is caused by far infrared lasers (10.6 micrometers) and results in $Sm^{3+}$ emission peaking in the orange-red region.

DETAILED DESCRIPTION

Figure 1:
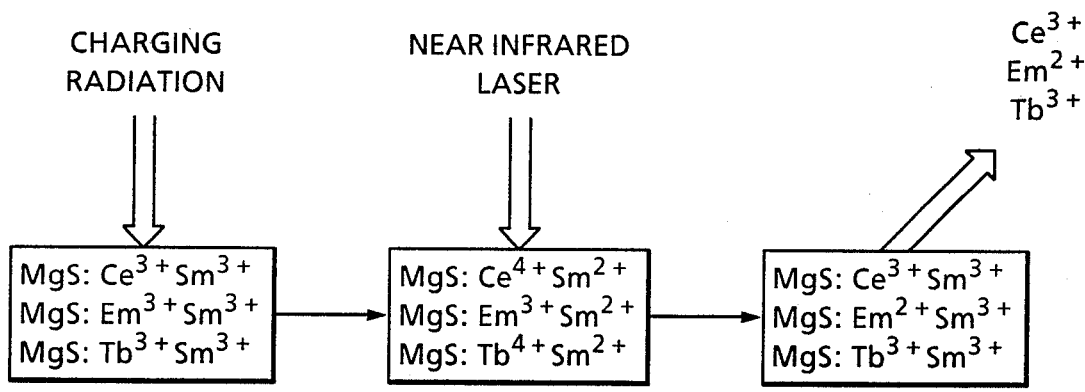
FIG. 1 is a diagrammatic representation of the discrimination of a near infrared laser according to the method of the present invention.
Figure 2:
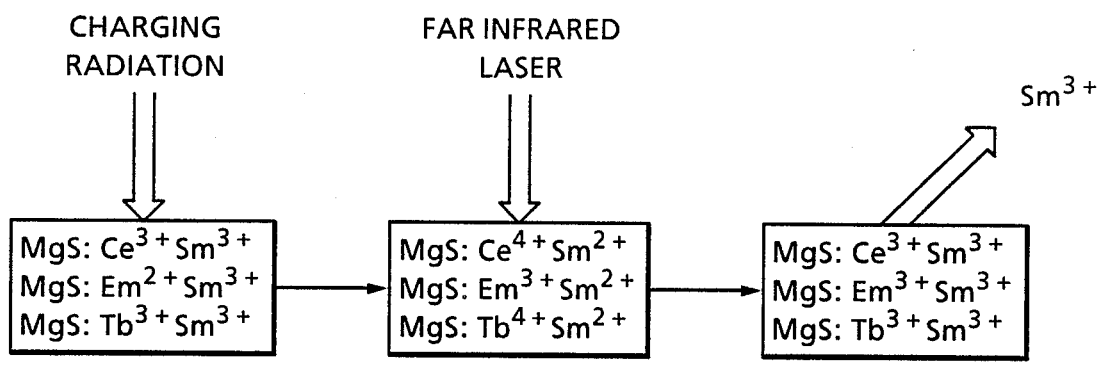
FIG. 2 is a diagrammatic representation of the discrimination of a far infrared laser according to the method of the present invention.

Referring now to the drawings, FIGS. 1 and 2 are diagrammatic representations of the laser discrimination method according to the present invention. The description to follow will focus on MgS; $Ce^{3+}$, $Sm^{3+}$. However, the method of the present invention applies to other doped phosphors such as MgS: $Eu^{2+}$, $Sm^{3+}$ and MgS:$Tb^{3+}$, $Sm^{3+}$. Also, many other known or future phosphors may also be acceptable for use with this method but have not yet been positively identified.

MgS was first synthesized from anhydrous magnesium sulfate by $CS_2$ reduction in the presence of argon. The charge was prepared by mixing MgS with the desired dopant and fired at 1150° C. in the presence of flowing argon bubbled through concentrated $H_2SO_4$. The reduction of sulfate to sulfide was completed in approximately two hours. Cerium (Ce) and Samarium (Sm) enter into this phosphor as $Ce^{3+}$ and $Sm^{3+}$, replacing $Mg^{2+}$.

Subsequent to doping, the MgS: Ce, Sm phosphor is exposed to charging radiation. The term 'charging' refers to the transition of the $Sm^{3+}$ ion to a $Sm^{2+}$ ion and the transition of the $Ce^{3+}$ ion to a $Ce^{4+}$ ion. Charging radiation may be in the form of ionizing radiation such as gamma, x or ultraviolet (UV) radiation. Charging radiation may also be visible light in the wavelength region of approximately 500 nanometers. However, for purposes of description only, it will be assumed that the charging radiation is ultraviolet radiation The phosphor should be exposed to charging radiation for a five to ten minute interval at ambient temperature not to exceed 150° C.

While the results of using charging radiation in the form of either ionizing radiation or visible light, the mechanisms of achieving the ion transition are different. Exposure to ionizing radiation causes a band to band transition as some of the electrons are subsequently captured from the conduction band by the $Sm^{3+}$ ions to become $Sm^{2+}$ ions. Free holes that are left behind are captured by the $Ce^{3+}$ ions to become $Ce^{4+}$ ions. However, in the case of irradiation by a 500 nanometer visible light, the electrons are raised from the 4f ground level of $Ce^{3+}$ to the $t_{2g}$ excited level. In MgS, the $t_{2g}$ level of $Ce^{3+}$ lies below the $e_g$ level and far below the conduction band. Therefore, electron transfers from the $t_{2g}$ level of $Ce^{3+}$ ions to nearby $Sm^{3+}$ ions through the process of tunneling which does not involve the conduction band.

On exposure to the charging radiation, the phosphor is ready to be exposed to an unspecified laser source. The resulting stimulated luminescence will be indicative of the type of laser source. The stimulated luminescence may be either optically stimulated luminescence or thermally stimulated luminescence. While both the optically stimulated luminescence and thermally stimulated luminescence processes involve the detrapping of trapped charges, it is the mechanism behind the luminescence that results in the laser discrimination method of the present invention.

Exposing the charged phosphor to a near infrared laser such as a 1.06 micrometer Nd:YAG, Nd:Glass or a 0.8-1.5 micrometer diode laser results in an energy transfer from $Sm^{2+}$ ions to $Ce^{4+}$ ions. The electrons are optically stimulated from the $Sm^{2+}$ ion traps and tunnel into the $Ce^{4+}$ or $Eu^{3+}$ ions. Consequently, the phosphor emits a characteristic $Ce^{3+}$ emission. This emission peaks in the green region around 527 nanometers.

Figure 3:
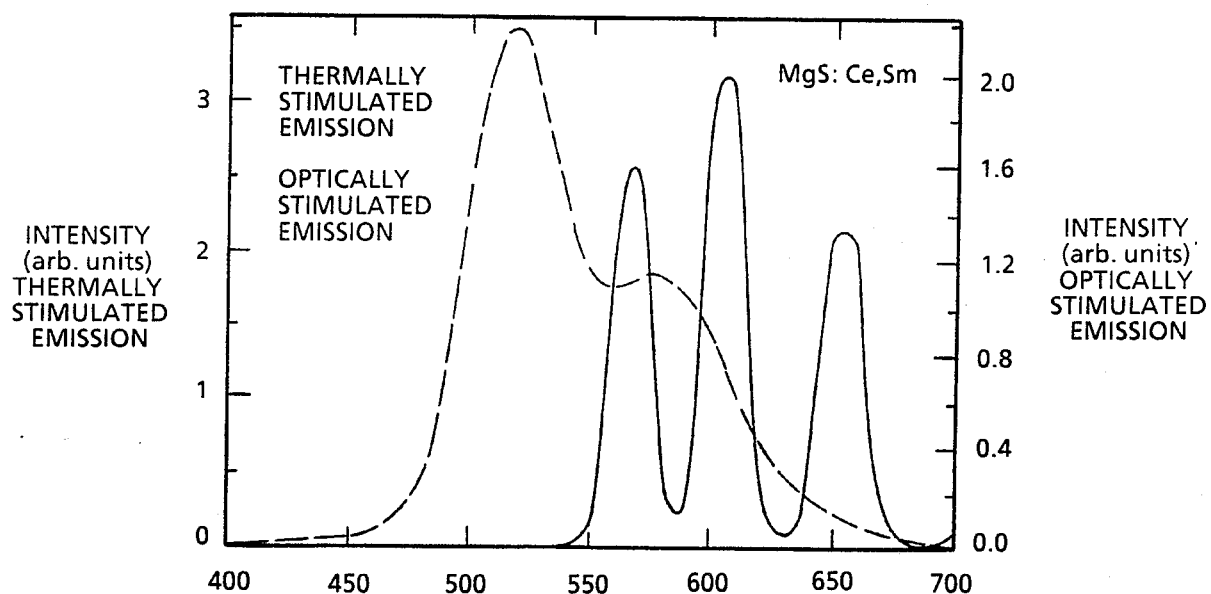
FIG. 3 is a graph of both the optically and thermally stimulated emission for MgS: Ce, Sm.

Conversely, exposing the same charged phosphor to a far infrared laser such as a 10.6 micrometer carbon dioxide laser results in an energy transfer from the $Ce^{4+}$ to $Sm^{2+}$ ions. The free holes trapped by $Ce^{3+}$ ions are released as the phosphor heats up due to the absorption of optical photons from the far infrared laser. The emission peaks when the phosphor has been heated by the far infrared laser to around 180° C. While there are peaks that occur at lower temperatures, these peaks fade over time. In contrast, the high temperature peaks remain stable for a longer period of time. Accordingly, it is the high temperature thermal luminescence peaks that are of interest. The holes that are released recombine with the $Sm^{2+}$ ion which results in $Sm^{3+}$ emission. The $Sm^{3+}$ emission peaks in the orange-red region around 609 nanometers, regardless of the nature of the second dopant. FIG. 3 is a graph showing both the optical and thermal stimulated emission of MgS: Ce, Sm.

Figure 4:
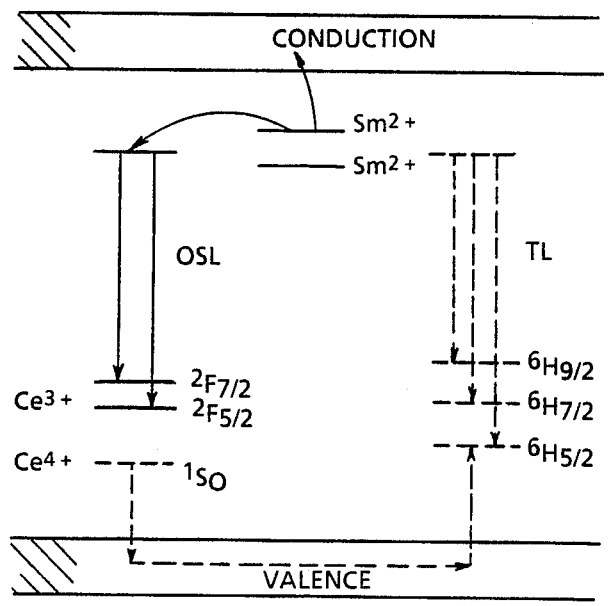
FIG. 4 is a phenomenological model of the luminescence mechanism of the MgS: Ce, Sm phosphor used in a method of the present invention.

The mechanism behind the type of luminescence caused by a near and a far infrared laser will now be explained with the use of the phenomenological model shown in FIG. 4 in conjunction with the graph of FIG. 3. In the case of the optically stimulated luminescence emission, electrons are stimulated from the $Sm^{3+}$ ion traps, which eventually recombine with the holes trapped at the $Ce^{3+}$ ions that act as recombination centers. Optically stimulated luminescence emission of MgS: Ce, Sm is a doublet with peaks at around 527 nanometers and 580 nanometers which can be identified as $Ce^{3+}$ transitions to the $^2F_{5/2}$ and $^2F_{7/2}$ ground states. The separation between this doublet 0.23eV. The converse is true, however, in the case of thermal luminescence emission where the $Ce^{3+}$ ion acts as a hole trap. Upon thermally simulating the samples, holes are released from traps and are captured by the samarium ions, which act as recombination centers for the thermoluminescence. The nature of the thermoluminescence observed at 560 nanometer, 609 nanometer, and 657 nanometers can be identified as $Sm^{3+}$ transitions to the $^6H_{5/2}$, $^6H_{7/2}$, and $^6H_{9/2}$ ground states respectively.

The advantage of the method of the present invention is its ability to use a single phosphor to discriminate between near and far infrared lasers. Its use will extend far into the field of the tracking and ranging in an unspecified laser radiation field. Thus, although the invention has been described relative to specific embodiments thereof, it is not so limited and numerous variations and modifications thereof will be readily apparent to those skilled in the art in light of the above teaching. It is therefore to be understood that within the scope of the appended claims the invention may be practiced otherwise than is specifically described.

What is claimed is:

1. A method of laser discrimination comprising the steps of:
   (a) Doping a MgS phosphor with $Sm^{3+}$ and one of the groups consisting of $Ce^{3+}$, $Eu^{2+}$ and $Tb^{3+}$;
   (b) Exposing said doped phosphor to charging radiation; and
   (c) Exposing said charged phosphor from step (b) to an unspecified laser source whereby a specific color luminescence is generated by said phosphor and is indicative of the type of laser source.

2. A method according to claim 1 wherein said step of doping comprises the steps of:
   (a) mixing MgS with $Sm^{3+}$ and one of the group consisting of $Ce^{3+}$, $Eu^{2+}$ and $Tb^{3+}$; and
   (b) firing said mixture at 1150° C. in the presence of argon and $H_2SO_4$.

3. A method according to claim 1 wherein said charging radiation is gamma, X or ultraviolet radiation.

4. A method according to claim 1 wherein said charging radiation is in visible light having a wavelength of approximately 500 nanometers.

5. A method according to claim 1 wherein said doped phosphor is exposed to charging radiation for five to ten minutes.

6. A method of discriminating a near infrared laser from a far infrared laser comprising the steps of:
   (a) doping a MgS phosphor with $Sm^{3+}$ and one of the group consisting of $Ce^{3+}$, $Eu^{2+}$ and $Tb^{3+}$;
   (b) exposing said doped phosphor to charging radiation whereby electrons are trapped by $Sm^{3+}$ to form $Sm^{2+}$ thereby leaving behind free holes and whereby said free holes are trapped by $Ce^{3+}$, $Eu^{2+}$ or $Tb_3^+$ to form $Ce^{4+}$, $Eu^{3+}$ or $Tb^{4+}$, respectively;
   (c) exposing said charged phosphor from step (b) to an unspecified laser source to cause luminescence of said phosphor indicative of the type of laser source, said unspecified laser source being a near infrared laser if said luminescence is caused by the release of said trapped electrons characterized by $Ce^{3+}$, $Eu^{2+}$ or $Tb^{3+}$ emission and said unspecified laser source being a far infrared laser if said luminescence is caused by the release of said trapped free holes characterized by $Sm^{3+}$ emission.

7. A method according to claim 6 wherein said doped phosphor is exposed to charging radiation for five to ten minutes.

8. A method according to claim 6 wherein said charging radiation is gamma, X or ultraviolet radiation.

9. A method according to claim 6 wherein said charging radiation is visible light having a wavelength of approximately 500 nanometers.

* * * * *